US007938997B2

(12) United States Patent
Zhao et al.

(10) Patent No.: US 7,938,997 B2
(45) Date of Patent: May 10, 2011

(54) PREPARATION OF BULK SUPERHARD B-C-N NANOCOMPOSITE COMPACT

(75) Inventors: Yusheng Zhao, Los Alamos, NM (US); Duanwei He, Sichuan (CN)

(73) Assignee: Los Alamos National Security, LLC, Los Alamos, MN (US)

( * ) Notice: Subject to any disclaimer, the term of this patent is extended or adjusted under 35 U.S.C. 154(b) by 778 days.

(21) Appl. No.: 11/529,657

(22) Filed: Sep. 27, 2006

(65) Prior Publication Data
US 2010/0237547 A1   Sep. 23, 2010

Related U.S. Application Data

(60) Continuation-in-part of application No. 10/824,691, filed on Apr. 14, 2004, now abandoned, which is a division of application No. 10/190,156, filed on Jul. 5, 2002, now Pat. No. 6,759,128.

(51) Int. Cl.
*C01B 35/08* (2006.01)
(52) U.S. Cl. ......... 264/125; 264/434; 51/307; 423/276
(58) Field of Classification Search .................. 264/63, 264/432, 125, 434; 51/307, 309; 423/276
See application file for complete search history.

(56) References Cited

U.S. PATENT DOCUMENTS
4,187,083 A    2/1980   Wedlake et al.
5,707,409 A *  1/1998   Martin et al. ............... 51/295

OTHER PUBLICATIONS

Yao, B. et al , "Formation of cubic C-BN by crystallization of nano-amorphous solid at atmosphere" J. Mater. Res., vol. 13, No. 7, Jul. 1998, pp. 1753-1756.*

Shackelford, J.F. "Introduction to Materials Science for Engineers", 1988, MacMillian Publishing, $2^{nd}$ ed. pp. 166, 167 and 704.*

Knittle et al., "High-Pressure Synthesis, Characterization, and Equation of State Cubic C-BN Solid Solutions," Phys. Rev. B., vol. 51, May 1995, pp. 12149-12156.

Komatsu et al., "Creation of Superhard B-C-N Heterodiamond Using an Advanced Shock Wave Compression Technology, " J. Mater. Processing Technology, vol. 85, 1999, pp. 69-73.

Utsumi et al., "In situ X-Ray and TEM Observations on the Phase Transitions of $BC_2N$ Under Static High Pressures," Proceedings of AIRAPT-18, Beijing, 2001, p. 186.

Taniguchi et al, "Sintering of Cubic Boron Nitride Without Additives at 7.7 Gpa and Above 2000° C," J. Mater. Res., vol. 14, No. 1, Jan. 1999, pp. 162-169.

Riedel, "Handbook of Ceramic Hard Materials," Wiley-VCH Verlag GmbH, D-69469, Weinheim, 2000, pp. 104-139. Solozhenko et al., "Synthesis of Superhard Cubic $BC_2N$," Appl. Phy. Letters Mar. 2001, vol. 78, No. 10, pp. 1385-1387.

Huang et al., "Structure and Phase Characteristics of Amorphous Boron-Carbon-Nitrogen Under High Pressure and High Temperature," J. Mater. Res., vol. 16, No. 4, Apr. 2001, pp. 1178-1184.

* cited by examiner

*Primary Examiner* — John Hoffmann
(74) *Attorney, Agent, or Firm* — Samuel L. Borkowsky (57) ABSTRACT

Bulk, superhard, B—C—N nanocomposite compacts were prepared by ball milling a mixture of graphite and hexagonal boron nitride, encapsulating the ball-milled mixture at a pressure in a range of from about 15 GPa to about 25 GPa, and sintering the pressurized encapsulated ball-milled mixture at a temperature in a range of from about 1800-2500 K. The product bulk, superhard, nanocomposite compacts were well sintered compacts with nanocrystalline grains of at least one high-pressure phase of B—C—N surrounded by amorphous diamond-like carbon grain boundaries. The bulk compacts had a measured Vicker's hardness in a range of from about 41 GPa to about 68 GPa.

14 Claims, 8 Drawing Sheets

PREPARATION OF BULK SUPERHARD B-C-N NANOCOMPOSITE COMPACT

RELATED APPLICATIONS

This is a continuation-in-part of U.S. patent application Ser. No. 10/824,691, filed Apr. 14, 2004, now abandoned which is a divisional of U.S. patent application Ser. No. 10/190,156 filed Jul. 5, 2002, now issued as U.S. Pat. No. 6,759,128, all incorporated by reference herein.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally superhard materials and more particularly to a superhard compact of nanocrystalline grains of at least one high-pressure phase of B—C—N embedded in a diamond-like amorphous carbon matrix and to a method for preparing the superhard compact.

BACKGROUND OF THE INVENTION

Superhard materials have a Vickers hardness (Hv), i.e. an indentation hardness, of at least 40 GPa and are widely used as abrasives for drilling, cutting, and other machining applications. Superhard materials often include boron, carbon, nitrogen and oxygen because these light elements have a small atomic radius and form strong and directional covalent bonds that produce tight, three-dimensional networks with extreme resistance to external shear.

Diamond is the hardest superhard material currently known, with an $H_v$ of about 70-100 GPa. However, the actual performance of diamond as an abrasive is somewhat limited. Diamond is an unsuitable abrasive for machining ferrous alloys and has limited applications for high-speed cutting because it is converted into graphite in the presence of oxygen at temperatures over 800° C.

Cubic BN (cBN) is another important superhard material. While cBN is widely used for machining fully hardened steels and exhibits much better thermal stability than diamond, it is only about half as hard ($H_v$=45~50 GPa) as diamond.

Superhard materials for industrial use are often in the form of sintered polycrystalline composites that incorporate microcrystalline grains of diamond or cubic boron nitride. The grains of this composite are tens to hundreds of micrometers in size, and usually include vacancies, dislocations, and other imperfections that multiply and propagate to form microcracks within individual crystals of a grain, and also along grain boundaries. As the microcracks grow, the materials deform and fracture.

Recently, a new class of materials known as superhard nanocomposites has been reported. Superhard nanocomposites contain superhard nanocrystalline grains embedded in an amorphous matrix. The amorphous matrix provides amorphous grain boundaries that absorb vacancies and dislocations, reduces the surface energy and residual stress among the grains, and permits the relaxation of mismatches between adjacent grains of different phases. While a number of superhard nanocomposites have been reported, no superhard nanocomposite bulk compact having the Vickers hardness of diamond has yet been prepared. Thus, there remains a need for a superhard nanocomposite compact with improved hardness, strength, and performance.

Therefore, an object of the present invention is to provide a bulk superhard nanocomposite compact with a high Vickers hardness.

Another object of the invention is to provide a method for preparing a bulk superhard nanocomposite compact with a high Vickers hardness.

SUMMARY OF THE INVENTION

In accordance with the purposes of the present invention, as embodied and broadly described herein, the present invention includes a superhard nanocomposite compact. The compact consists essentially of nanocrystalline grains of at least one high-pressure phase of B—C—N surrounded by amorphous diamond-like carbon grain boundaries.

The invention also includes a process for preparing a bulk, superhard, nanocomposite compact. The process involves ball milling a mixture of graphite and hexagonal boron nitride to produce a ball-milled mixture comprising amorphous boron nitride, nanocrystalline boron nitride, or mixtures thereof, the ball-milled mixture further comprising amorphous carbon, nanocrystalline graphitic carbon, or mixtures thereof; encapsulating the ball-milled mixture at a pressure in a range of from about 15 GPa to about 25 GPa; and thereafter sintering the pressurized, encapsulated ball-milled mixture at a temperature in a range of from about 1800 K to about 2500 K, thereby producing a bulk, superhard nanocomposite compact consisting essentially of nanocrystalline grains of at least one ternary phase of B—C—N surrounded by amorphous diamond-like carbon grain boundaries.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

The present invention includes a superhard B—C—N nanocomposite compact to and a method for preparing the compact. The compact includes nanocrystalline grains of at least one high-pressure B—C—N phase embedded in a diamond-like amorphous matrix. The practice of the invention can be further understood with the accompanying figures. Similar or identical structure is identified using identical callouts.

Figure 1:
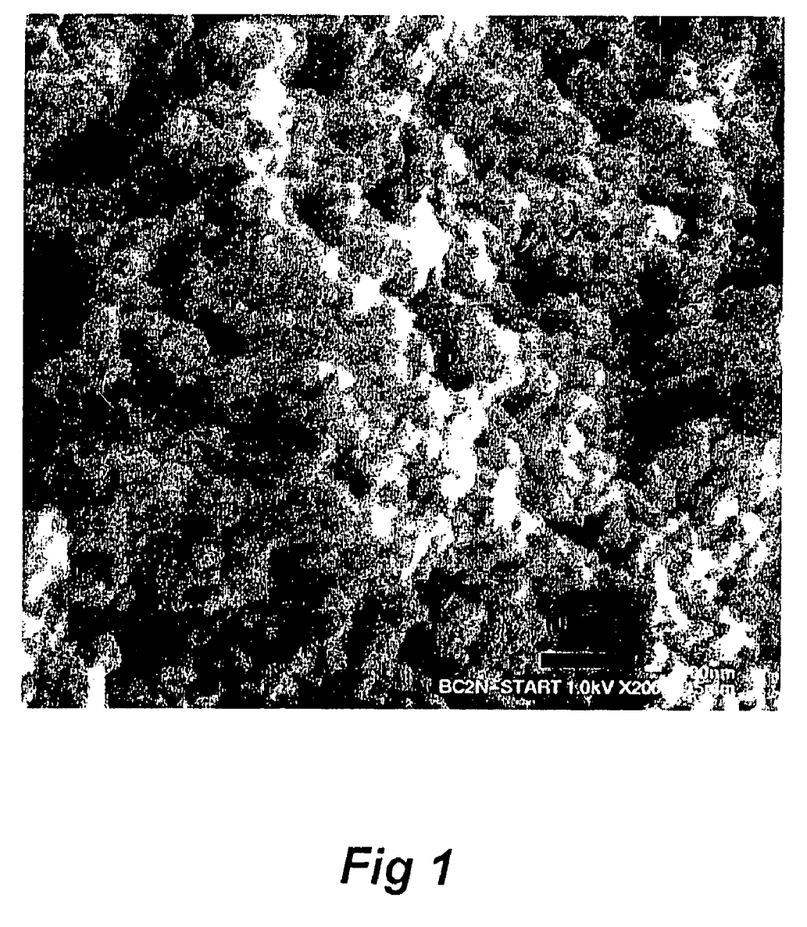
FIG. 1 shows a high magnification SEM image of the precursor material used to prepare the bulk, superhard nanocomposite compact of the invention.

The compact is produced by first preparing a ball-milled mixture of graphite and hexagonal boron nitride (hBN). A tungsten carbide vial and tungsten carbide milling balls were used for the ball milling procedure. FIG. 1 shows a high magnification scanning electron microscope (SEM) image of the ball-milled powdered mixture after 34 hours of ball milling. As the SEM image shows, the mixture is dark, has a grain size less than 0.1 micron, and does not appear to have a crystalline morphology.

Figure 2:
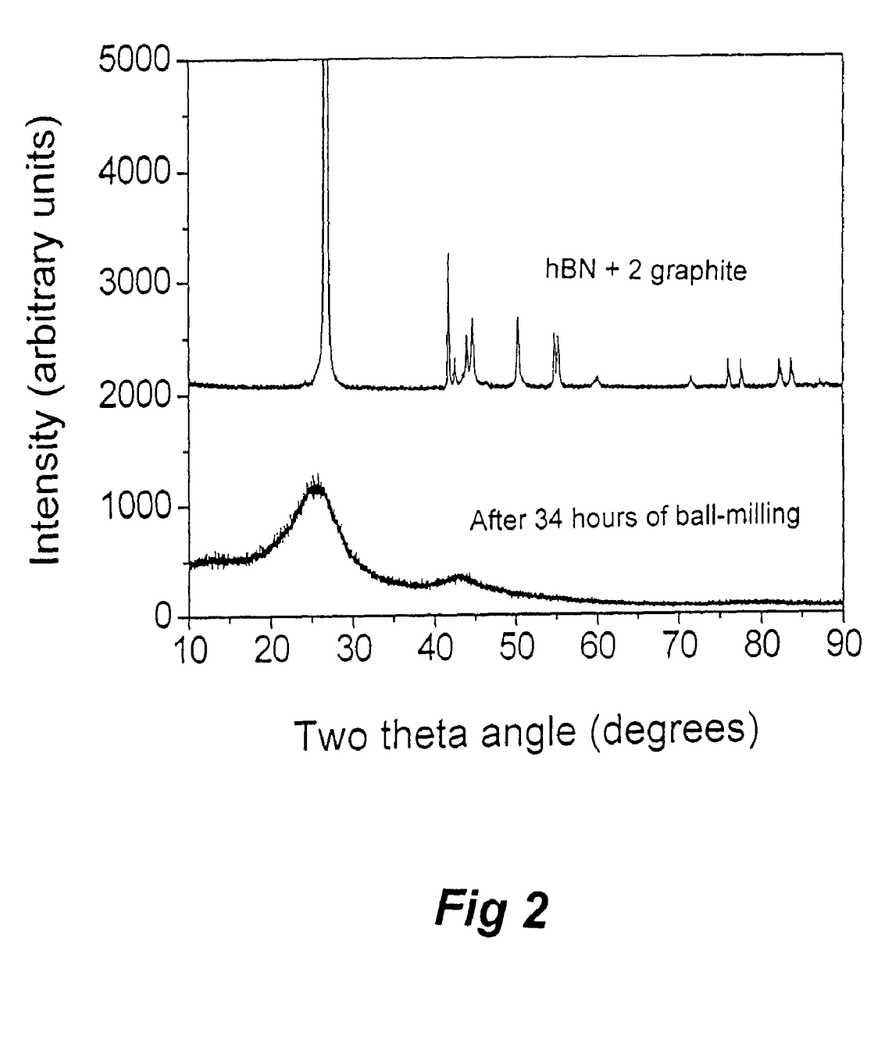
FIG. 2 shows an x-ray diffraction pattern of the precursor material of FIG. 1.

FIG. 2 includes two x-ray diffraction spectra. The upper spectrum is of the mixture of graphite and hexagonal boron nitride before ball milling. The lower spectrum is of the ball-milled mixture after 34 hours of ball milling. As FIG. 2 shows, the ball-milled mixture appears to be amorphous.

Figure 3:
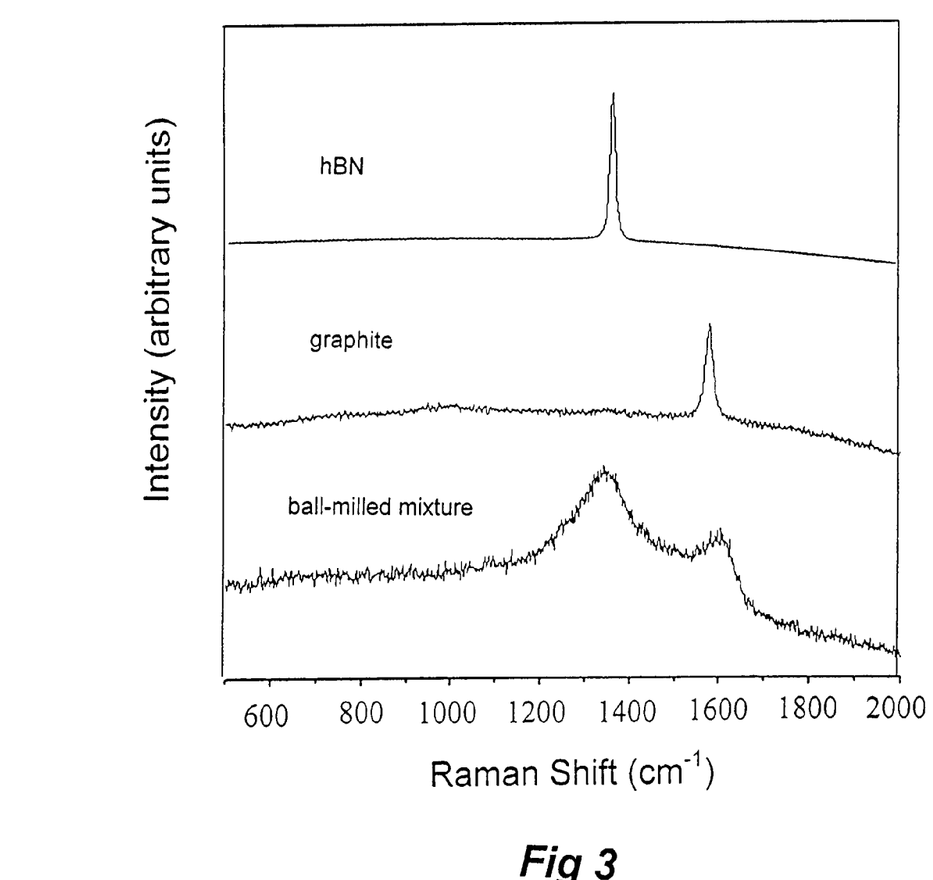
FIG. 3 shows and a Raman spectrum of the precursor material of FIG. 1.

FIG. 3 shows three Raman spectra. The upper spectrum is of hexagonal boron nitride (hBN), the middle spectrum is of graphite, and the lower spectrum is of the ball-milled mixture of graphite and hBN. The lower spectrum includes a peak at 1350 cm$^{-1}$ (a defect/disorder peak) and a peak at 1580 cm$^{-1}$ that is assigned to a graphitic phase. Importantly, the lower spectrum suggests that along with a graphite phase, the ball-milled mixture also includes grains of nanocrystalline particles and the intensity ratio between the 1350 cm$^{-1}$ peak and the 1580 cm$^{-1}$ peak indicates that the grain size is about 2-3 nanometers (nm).

A sample of the ball-milled powder having the lower Raman spectrum of FIG. 3 was encapsulated in a cylindrical platinum capsule and compressed using a multi-anvil to a pressure in a range of from about 5 GPa to about 25 GPa.

At this elevated pressure, the encapsulated powder was sintered at a temperature in a range of from about 1000 K to about 2500 K for a duration in a range of from about 2 minutes to about 120 minutes. After the sintering period, the capsule was brought to room temperature and decompressed to ambient pressure. The compact was removed from the capsule and the ends of the compact were polished with a diamond abrasive. The resulting polished compact was a well-sintered cylindrical bulk compact having a height of about 1.5-mm and a diameter of about 1.2-mm. These dimensions are a reflection of the dimensions of the capsule used. Obviously, compacts of different sizes and shapes depend on the size and shape of the capsule and the cell assembly used. A larger capsule and cell assembly would require a larger sample size and result in a larger compact. Likewise, smaller capsules and cell assemblies could also be used to prepare smaller compacts.

Several examples of bulk compacts were prepared according to the conditions summarized in TABLE 1 below. Those of entries 5 through 11 are invention compacts.

TABLE 1

| Entry | Precursor powder composition | Pressure (GPa) | Sintering temperature (K) | Sintering Time (minutes) | Vickers hardness (GPa) | Color |
|---|---|---|---|---|---|---|
| 1 | BCN | 20 | 1300 | 2 | | Black |
| 2 | BCN | 20 | 2100-2400 | 10 | | Light yellow |
| 3 | BC$_2$N | 6-8 | 1500 | 120 | | Black |
| 4 | BC$_2$N | 10 | 2000 | 5 | | Black |
| 5 | BC$_2$N | 15 | 1800 | 5 | 50 | |
| 6 | BC$_2$N | 15 | 2000 | 5 | 41 | Black |
| 7 | BC$_2$N | 16 | 2100 | 5 | 50 | Gray-white |
| 8 | BC$_2$N | 20 | 2200 | 5 | 62 | Light yellow |
| 9 | BC$_2$N | 25 | 2130 | 10 | | Light yellow |
| 10 | BC$_2$N | 25 | 2300 | 60 | | Light yellow |
| 11 | BC$_4$N | 20 | 2300 | 5 | 68 | brown |

As TABLE 1 shows, the compacts varied in color. Some were translucent, while others were opaque. Some were black (entries 1, 3, 4, and 6) while others were gray-white (entry 7), brown (entry 11), and light yellow (entries 2, 8, 9, and 10. The color seems to be dependent on the relative amount of graphite, the pressure, and the sintering temperature).

The Vickers hardness for several of them (entries 5, 6, 7, 8, and 11) were measured and determined to be in the range of about 41-68 GPa. The Hv for any particular compact of the invention appears to be dependent upon the precise composition of the precursor powder and on the synthesis conditions. Three precursor powder compositions were used. Entries 1 and 2 (BCN) employed a composition of a 1:1 molar ratio of graphite:hBN (i.e. 1 part graphite and 1 part hBN). Entries 2-10 (BC$_2$N) employed a composition 2:1 molar ratio of graphite:hBN (i.e. 2 parts graphite and 1 part hBN). Entry 11 (BC$_4$N) employed a powder composition of a 4:1 molar ratio of graphite:hBN (i.e. 4 parts graphite and 1 part hBN. Pressures varied from about 6 GPa to about 25 GPa, sintering temperatures varied from about 1300 K (entry 1) to about 2400 K (entry 2), and sintering times varied from 2 minutes (entry 1) to about 120 minutes (entry 3). The preparation of several of these compacts is now described.

EXAMPLE 1

The compact of entry 2 of TABLE 1 was synthesized as follows. About 5 grams of a ball milled mixture of a 1:1 molar ratio of graphite:hBN were prepared. About 3 mm$^3$ of the ball-milled mixture was placed into a platinum capsule. Using a split-sphere multi-anvil press, the encapsulated mixture was subjected to a pressure of about 20 GPa, and the pressurized, encapsulated mixture was then sintered at a temperature of about 2100-2400 K for about 10 minutes. The resulting compact was light yellow in color.

EXAMPLE 2

A compact of the invention (entry 7 of TABLE 1) was synthesized as follows. About 3 mm$^3$ of a ball-milled mixture of a 2:1 molar ratio of graphite:hBN was placed into a platinum capsule. Using a split-sphere multi-anvil press, the encapsulated mixture was subjected to a pressure of about 15 GPa, and the pressurized encapsulated mixture was then sintered at a temperature of about 2100 K for about 5 minutes. The resulting bulk compact had a measured Vickers hardness was 50 GPa.

EXAMPLE 3

A compact of the invention (entry 8 of TABLE 1, was synthesized as follows. About 3 mm$^3$ of a ball-milled mixture of a 2:1 molar ratio of graphite:hBN was placed into a platinum capsule. Using a split-sphere multi-anvil press, the encapsulated mixture was subjected to a pressure of about t 20 GPa, and the pressurized encapsulated mixture was then sintered at a temperature of about 2200 K for about 5 minutes. The resulting bulk compact of the invention was light yellowish in color, translucent, and had a measured Vickers hardness of 62 GPa.

EXAMPLE 4

A compact of the invention (entry 9 of TABLE 1) was synthesized as follows. A ball-milled mixture of a 2:1 molar ratio of graphite:hBN was placed into a platinum capsule. Using a split-sphere multi-anvil press, the encapsulated mixture was subjected to a pressure of about 25 GPa, and the pressurized encapsulated mixture was then sintered at a temperature of about 2130 K for about 10 minutes. The resulting bulk compact of the invention was light yellow in color.

EXAMPLE 5

A compact of the invention (entry 10 of TABLE 1) was synthesized as follows. About 3 mm$^3$ of a ball-milled mixture of a 2:1 molar ratio of graphite:hBN was placed into a platinum capsule. Using a split-sphere multi-anvil press, the encapsulated mixture was subjected to a pressure of about 25 GPa, and the pressurized encapsulated mixture was then sintered at a temperature of about 2300 K for about 60 minutes. The resulting bulk compact of the invention was light yellow in color.

EXAMPLE 6

A compact of the invention (entry 11 of TABLE 1) was synthesized as follows. A mixture of a 4:1 molar ratio of graphite:hBN was prepared. About 3 mm$^3$ of the ball-milled mixture was placed into a platinum capsule. Using a split-sphere multi-anvil press, the encapsulated mixture was subjected to a pressure of about 20 GPa, and the pressurized encapsulated mixture was then sintered at a temperature of about 2300 K for about 5 minutes. The resulting bulk compact of the invention was brownish and translucent, with a measured Vickers hardness was 68 GPa.

The microstructure and composition of the compact of the invention was probed using a variety of techniques. While optical microscopy and scanning microscopy were relatively uninformative, the granular structure of the compact of the invention was revealed using the Advanced Photon Source (APS) at Argonne National Laboratory, which provided monochromatic synchrotron x-ray diffraction in angle dispersive mode. The compact was interrogated using a narrow (5×7 μm$^2$), collimated X-ray beam (λ=0.4146 Å). The x-rays by the compact were collected using an image plate in angle-dispersive mode to cover a 2-Theta (2Θ) angle range up to 32 degrees, which corresponds to a minimum d-spacing of 0.77 Å. Changing the position of the beam spot on the compact had no effect on the diffraction pattern, which indicated that the sample was homogeneous in structure and composition.

Figure 4:
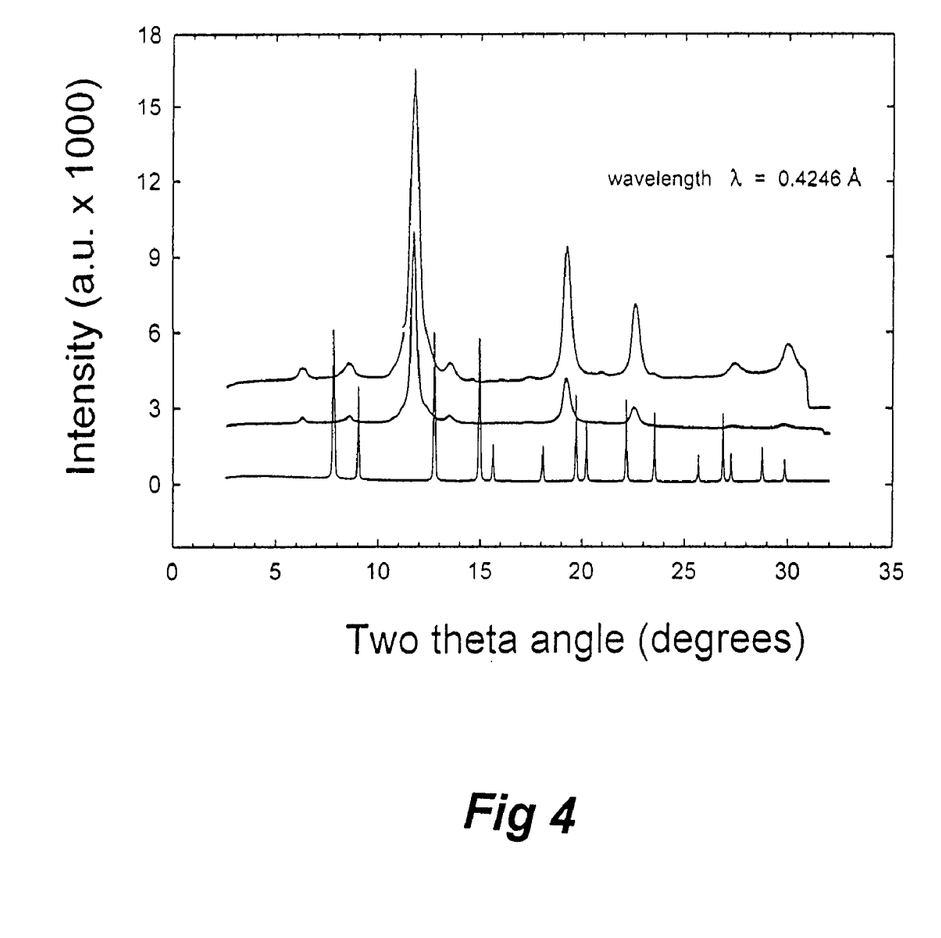
FIG. 4 shows diffraction patterns plotted as intensity versus 2-Theta Angle.

FIG. 4 shows X-ray diffraction patterns that are plotted as intensity versus 2-Theta Angle for the BC$_2$N bulk compact of the invention synthesized at a pressure 20 GPa and a sintering temperature of 2200 K. The upper diffraction pattern was obtained when the compact was rocked with an amplitude of 5 μm. The middle diffraction pattern is for the non-rocking, stationary compact, and the lower pattern is a standard diffraction pattern of cerium oxide (CeO$_2$), which is included in order to indicate the resolution of the x-ray diffraction instrument. As FIG. 4 shows, the peaks of the middle pattern are about 5-6 times as broad as the peaks of the lower pattern. As the upper pattern shows, the peaks broadened even more (8-10 times as broad as the lower pattern) when the sample was rocked. From these observations, it was concluded that the compact includes nanocrystalline grains. Using Scherrer's equation, the grain size was estimated at about 4-8 nm.

The major diffraction peaks shown in FIG. 4 for the compact of the invention are consistent with a face-centered-cubic (fcc) zinc-blende (ZnS) structure with a unit cell parameter a=3.595(7) Å. This unit cell dimension lies between diamond (a=3.567 Å) and cBN (a=3.616 Å), and is in close agreement with the unit cell parameter reported by E. Knittle et al. in "High Pressure Synthesis, Characterization, and Equation of State of Cubic C-BN Solid Solutions," Phys. Rev. B. vol. 51, 1995, pp. 12149-12156; by T. Komatsu et al. in "Creation of Superhard B—C—N Heterodiamond Using Shock Wave Compression Technology," J. Mater. Processing Technology, vol. 85, 1999, pp. 69-73; and by W. Utsumi et al., in "In situ X-Ray and TEM Observations on the Phase Transitions of BC$_2$N Under Static Pressures," Proceedings of AIRAPT-18, Beijing, 2001, p. 186. From these papers, it appears that E. Knittle et al., T. Komatsu et al. and W. Utsumi et al. were unable to produce the well-sintered, bulk superhard nanocomposite compact of the present invention.

Figure 5:
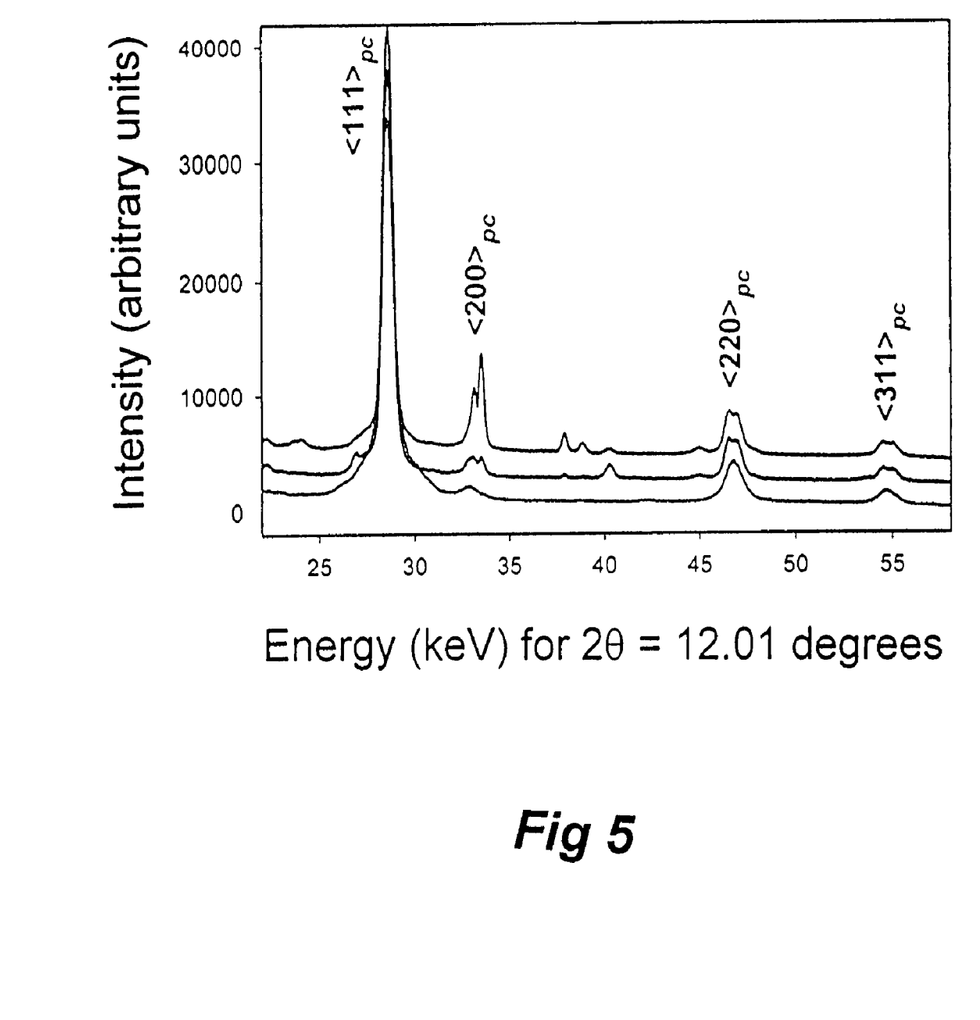
FIG. 5 shows synchrotron x-ray patterns in the energy dispersive mode for three compacts of the invention.

FIG. 5 shows synchrotron x-ray diffraction patterns in the energy dispersive mode for three compacts of the present invention. The compact that produced the top x-ray diffraction pattern was sintered at 15 GPa and 2000 K. The compact that produced the middle x-ray diffraction pattern was sintered at 16 GPa and 2100 K. The compact that produced the bottom x-ray diffraction pattern was sintered at 20 GPa and 2200 K. Each pattern includes the <111>pc and <220>pc peaks of the fcc lattice. Compacts of the invention prepared at 20 GPa were about 15-20% harder than those prepared at 15-16 GPa. Compacts that were prepared at still lower pressures produced x-ray diffraction patterns that exhibited additional peaks and apparent peak splitting that was most noticeable for the <200>pc peak. This may suggest the existence of a superlattice, lower symmetry, or an additional phase. Generally, compacts prepared at higher pressures appear to have higher symmetry.

Figure 6:
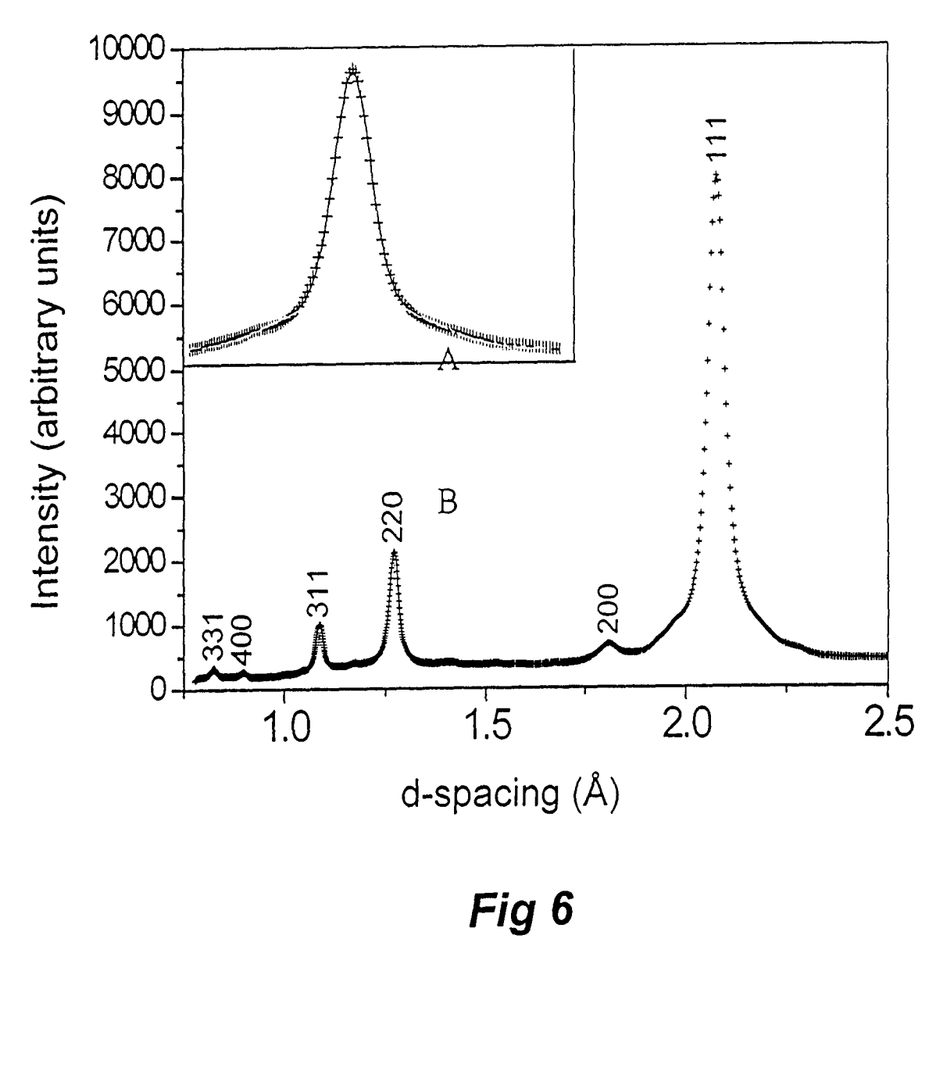
FIG. 6 shows a synchrotron XRD pattern plotted as intensity versus d-spacing for a compact of the invention prepared at 20 GPa and 1900 C.

FIG. 6 shows the synchrotron XRD pattern, plotted as intensity in arbitrary units versus d-spacing in angstroms, of a compact prepared at 20 GPa and 2200 K. The top left inset shows that the <111> peak can be fitted by a sum of two curves; a broadened crystalline peak (curve A) and an amorphous hump (curve B). The plus (+) indicates the data observed and the dark solid line is the curve calculated from the fitting of curve A with curve B.

Figure 7:
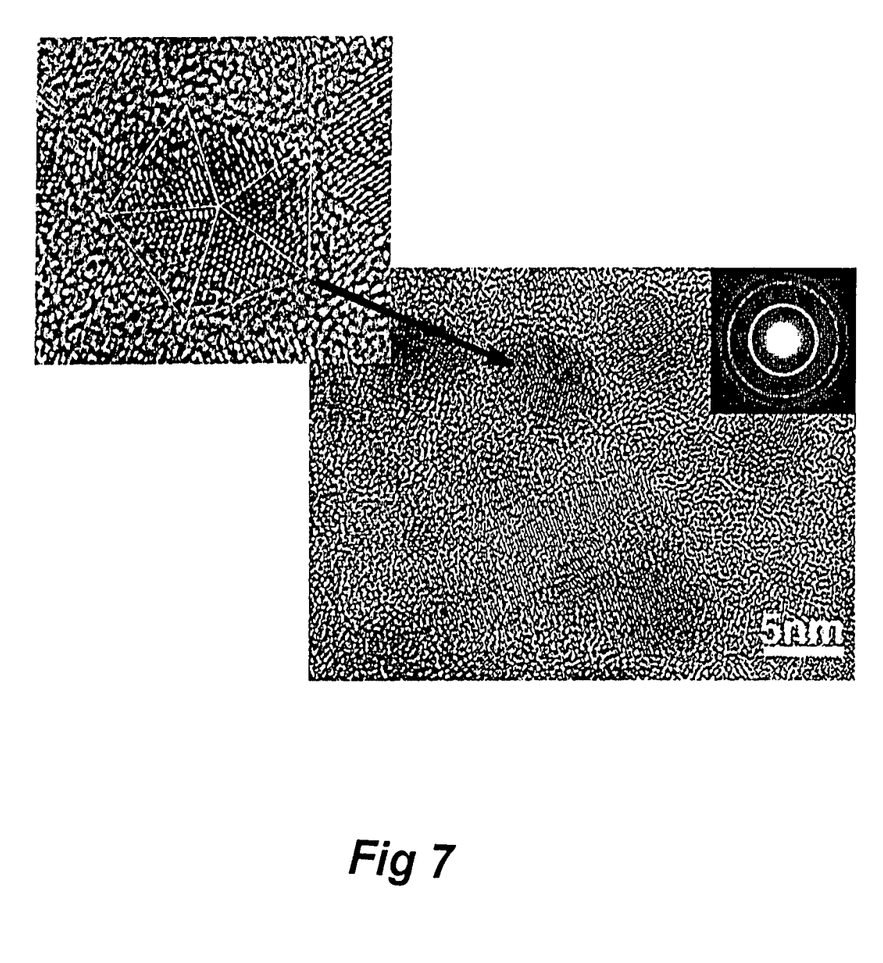
FIG. 7 shows a high-resolution transmission electron microscopy (HRTEM) image of a compact of the invention.

FIG. 7 shows high-resolution transmission electron microscopy (HRTEM) image of a BC$_2$N compact of the present invention synthesized at a pressure of 20 GPa and a sintered at a temperature of 2200 K for 5 minutes. The HRTEM image confirms the presence of 3-8 nm nanocrystalline grains with an average size of about 5 nm, which is consistent with the synchrotron X-ray diffraction pattern. The zinc-blende fcc structure, apparent from FIG. 4, is confirmed by the electron diffraction pattern shown in the top right inset of FIG. 7. FIG. 7 includes an enlarged image of a grain. The enlarged image appears to include an apex of a regular icosohedron, a regular polyhedron with 20 triangular faces and five-fold symmetry. Lines have been added to more clearly show these features. Also according to FIG. 7, the grain boundaries between the nanocrystalline grains appear to be amorphous.

Figure 8:
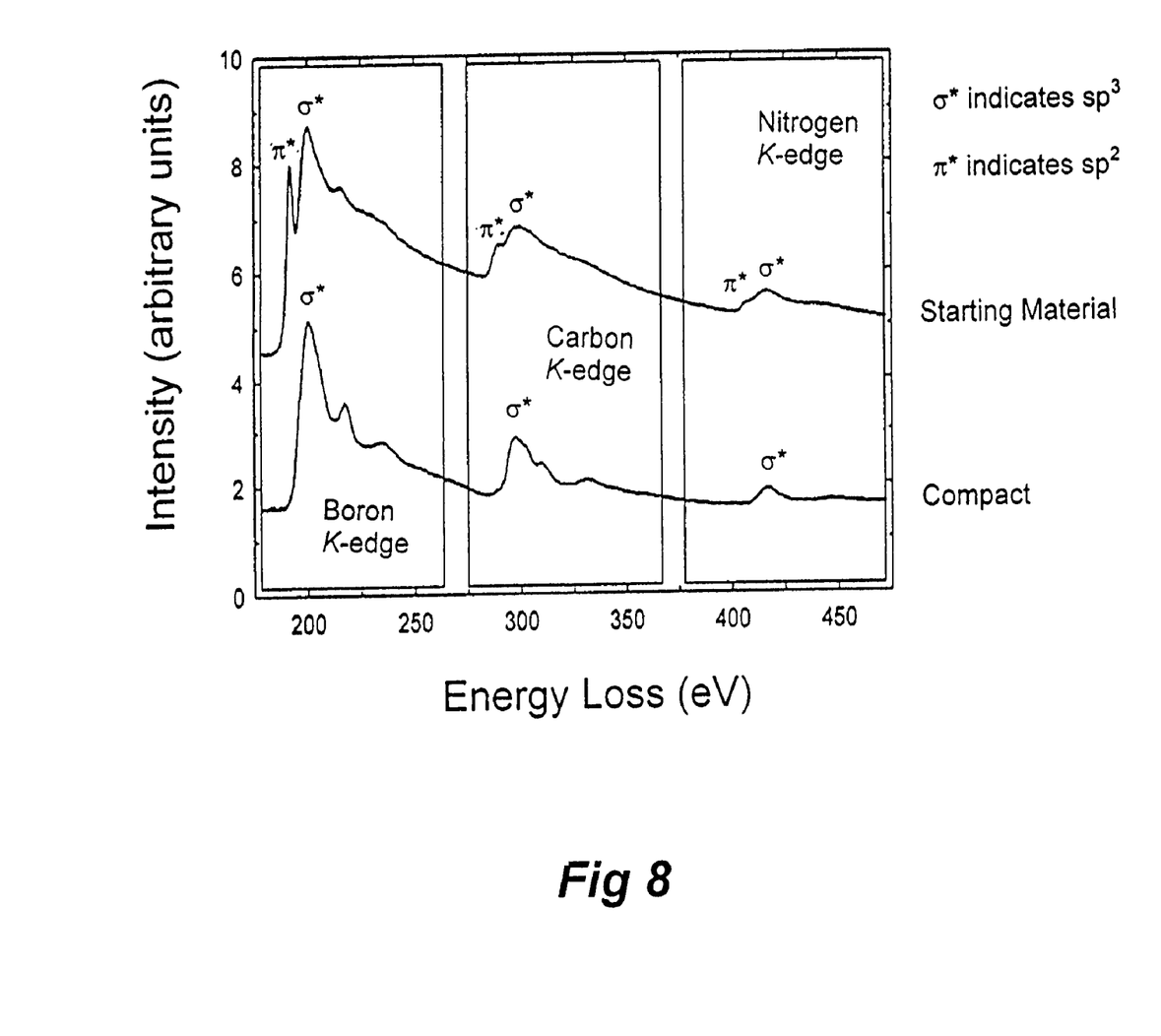
FIG. 8 shows an electron energy-loss spectroscopy (EELS) spectrum for amorphous, ball-milled starting material and an EELS spectrum for a compact of the invention.

The chemical composition and chemical bonding of individual grains of the compact were determined using electron energy-loss spectroscopy (EELS), a powerful technique for obtaining local chemical composition and chemical bonding information in materials composed of light elements. Samples of the compact were prepared for EELS by an ion-thinning process or by directly impacting the sample into fine powder. The results were the same for both sample preparation methods. A narrow (3-4 nm) focused electron beam was used to probe the chemical is composition and bonding of individual nanocrystalline grains. FIG. 8 shows' an upper EELS spectrum for the amorphous, ball-milled starting material and a lower EELS spectrum for a single nanocrystalline grain. The lower EELS spectrum includes the K-edges for B, C, and N, which confirms that the grain is composed of a single ternary B—C—N phase rather than a mixture of a diamond phase and a cBN phase. The upper EELS spectrum for the amorphous ball-milled starting material includes $\pi^*$ peaks at the K-edges for the B, C, and N. The appearance of these $\pi^*$ peaks in the amorphous starting material suggests the presence of $sp^2$-hybridized hexagonal ring fragments. The $\pi^*$ peaks of the EELS spectrum of the amorphous material do not appear in the EELS spectrum of the compact.

The chemical composition of the grain boundaries was examined using a combination of HRTEM and EELS. Unexpectedly, the grain boundaries are composed of amorphous, diamond-like carbon (DLC). DLC is typically produced by such methods as vacuum arc or pulsed laser deposition, and has stimulated great interest because of its high hardness, chemical inertness, thermal stability, wide optical gap, and negative electron affinity. It is believed that the bulk, superhard, nanocomposite compact of the invention is the first bulk, nanostructured compact reported with DLC grain boundaries, which are believed to contribute significantly to the mechanical strength of the compact.

The enhanced fracture toughness of the compact of the invention is likely due, at least in part, to the substantial absence of vacancies and dislocations in the individual nanocrystalline grains, and also to the difficulty of microcrack propagation through the amorphous grain boundaries separating the grains.

The effects of using a ball-milled amorphous material as the precursor material were examined by preparing compacts from a different precursor material: a mixture of graphite and hexagonal boron nitride (hBN) that had not been subjected to ball milling. Compacts prepared without ball milling the mixture of graphite and hBN did not include nanocrystalline grains of $BC_2N$. Instead, these compacts included segregated phases of diamond and cBN. The presence of is segregated phases was first suggested by optical microscopy, more strongly indicated by x-ray diffraction spectra that showed twin-peaks of all the major x-ray diffraction peaks, and finally confirmed by Raman spectra that showed the characteristic peaks of diamond and cBN.

The invention also includes machining tools of the bulk superhard compact of the invention. The compact could be used for drilling, cutting, puncturing, and other types of machining.

In summary, the invention is involved with the preparation of well-sintered, bulk, superhard, nanocomposite compacts having nanocrystalline grains of at least one high-pressure phase of B—C—N embedded in a diamond-like amorphous carbon matrix. During the preparation, a ball-milled mixture of graphite and hexagonal boron nitride is prepared using a ratio of graphite to boron of about 1:1, about 2:1 and about 4:1. Samples of each of these ball-milled mixtures are then encapsulated at elevated pressures, preferably at a pressure of from about 15 GPa to about 25 GPa, more preferably at a pressure of from about 16 GPa to about 25 GPa, more preferably at a pressure of from about 20 GPa to about 25 GPa. Some individual preferred encapsulated pressures include 15 GPa, 16 GPa, 20 GPa, and 25 GPa. When encapsulated at these pressures, samples are then sintered, preferably at a temperatures in a range from about 1800 K to about 2500 K, more preferably at a temperature in a range of from about 2000 K to about 2500 K, more preferably at a temperature of from about 2100 K to about 2500 K, more preferably at a temperature of from about 2130 K to about 2500 K, more preferably at a temperature of from about 2200 K to about 2500 K, more preferably at a temperature of from about 2300 K to about 2500 K. A sintering temperature of about 2300 K is a preferred sintering temperature. A variety of analytical techniques show that the bulk compact contains nanocrystalline grains of B—C—N having a diamond-like structure. The structure symmetry and Vickers hardness (Hv=50-73 GPa) of the bulk compact of the invention appear to increase with the pressure used to prepare the compact. The Vickers hardness of several examples of the bulk compact was higher than that for cBN (47 GPa, see T. Taniguchi et al. in "Sintering of cubic boron nitride without additives at 7.7 GPa and above 2000° C., J. Mater. Res., vol. 14, pp. 162-169, 1999) and for hBN single crystals (45-50 GPa, see Handbook of Ceramic Hard Materials, R. Riedel ed., pp. 104-139, Wiley-VCH Verlag GmbH, D-69469, Weinheim, 2000) and were very close to the hardness of diamond (70-100 GPa). It is expected that the compact of the invention is more stable at high temperatures than diamond and that machining tools employing the compact of the invention will not react with ferrous metals during high-speed cutting.

The foregoing description of the invention has been presented for purposes of illustration and description and is not intended to be exhaustive or to limit the invention to the precise form disclosed, and obviously many modifications and variations are possible in light of the above teaching. Commercially available autofocus laser end effectors, for example, could be used instead of the laser end effectors described herein.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A process for preparing a bulk, superhard, nanocomposite compact, comprising:
   (a) ball milling a mixture consisting essentially of graphite and hexagonal boron nitride to produce a ball-milled mixture comprising amorphous boron nitride, nanocrystalline boron nitride, or mixtures thereof, the ball-milled mixture further comprising amorphous carbon, nanocrystalline graphitic carbon, or mixtures thereof;

(b) encapsulating the ball-milled mixture; and thereafter (c) subjecting the now encapsulated ball-milled mixture to a pressure in a range of from about 15 GPa to about 25 GPa; and thereafter (d) sintering the pressurized, encapsulated ball-milled mixture at a temperature in a range of from about 1800 K to about 2500 K for a period of time sufficient to convert the pressurized encapsulated ball-milled mixture into a bulk, superhard nanocomposite compact consisting essentially of nanocrystalline grains of at least one ternary phase of B—C—N surrounded by amorphous diamond-like carbon grain boundaries.

2. The process of claim 1, wherein the step of ball milling a mixture consisting essentially of graphite and hexagonal boron nitride involves ball milling a mixture that consists essentially of about 1 part graphite to about 1 part hexagonal boron nitride.

3. The process of claim 1, wherein the step of ball milling a mixture consisting essentially of graphite and hexagonal boron nitride involves ball milling a mixture that consists essentially of about 2 parts graphite to about 1 part hexagonal boron nitride.

4. The process of claim 1, wherein the step of ball milling a mixture consisting essentially of graphite and hexagonal boron nitride involves ball milling a mixture that consists essentially of 4 parts graphite to about 1 part hexagonal boron nitride.

5. The process of claim 1, wherein step (d) comprises sintering the pressurized, encapsulated ball-milled mixture at a temperature of about 2000 K to about 2500 K.

6. The process of claim 1, wherein step (c) comprises subjecting the encapsulated ball-milled mixture to at a pressure of about 16 GPa.

7. The process of claim 1, wherein step (c) comprises subjecting the encapsulated, ball-milled mixture to a pressure in a range of from about 20 GPa to about 25 GPa, and step (d) comprises sintering the pressurized, encapsulated ball-milled mixture at a temperature in a range of from about 2000 K to about 2500 K.

8. The process of claim 1, wherein step (c) comprises subjecting the encapsulated, ball-milled mixture to a pressure in a range of from about 20 GPa to about 25 GPa and step (d) comprises sintering the pressurized, encapsulated ball-milled mixture at a temperature in a range of about 2100 K to about 2400 K.

9. The process of claim 1, wherein step (c) comprises subjecting the encapsulated, ball-milled mixture to a pressure of about 20 GPa and step (d) comprises sintering the pressurized, encapsulated ball-milled mixture at a temperature in a range of from about 2000-2400 K.

10. The process of claim 1, wherein step (c) comprises subjecting the encapsulated, ball-milled mixture to at a pressure of about 25 GPa and step (d) comprises sintering the pressurized, encapsulated ball-milled mixture at a temperature in a range of about 2100 K to about 2300 K.

11. The process of claim 1, wherein the compact has a Vickers hardness in a range of from about 41 GPa to about 69 GPa.

12. The process of claim 1, wherein the compact has a Vickers hardness in a range of from about 50 GPa to about 68 GPa.

13. The process of claim 1, wherein the compact has a Vickers hardness in a range of from about 62 GPa to about 58 GPa.

14. The process of claim 1, wherein the compact has a Vickers hardness of about 68 GPa.

\* \* \* \* \*